United States Patent [19]

Dziedzic et al.

[11] Patent Number: 4,459,722

[45] Date of Patent: Jul. 17, 1984

[54] HELICAL WIRE-CONICAL WEDGE GRIPPING DEVICE HAVING CONICALLY FORMED ROD ENDS BETWEEN WEDGE AND COMPLEMENTARY SOCKET THEREFOR

[75] Inventors: Edward Dziedzic; Gary R. Dickerson; David P. Eppinger, all of Centralia, Mo.

[73] Assignee: A. B. Chance Co., Centralia, Mo.

[21] Appl. No.: 382,773

[22] Filed: May 27, 1982

[51] Int. Cl.³ .............................................. F16G 11/02
[52] U.S. Cl. ................................ 24/122.6; 24/115 N; 24/131 C; 24/136 L
[58] Field of Search ............. 24/131 C, 136 L, 115 N, 24/122.6, 122.3

[56] References Cited

U.S. PATENT DOCUMENTS

| | | | |
|---|---|---|---|
| 2,744,707 | 5/1956 | Peterson | 24/131 C |
| 3,007,243 | 11/1961 | Peterson | |
| 3,163,706 | 12/1964 | Peterson | |
| 3,520,032 | 7/1970 | Howlett et al. | 24/122.6 |
| 3,551,959 | 1/1971 | Mastalski | |
| 3,551,960 | 1/1971 | Little | |
| 3,561,071 | 2/1971 | Schlein | 24/131 C |
| 3,775,811 | 12/1973 | Smrekar et al. | |
| 3,829,937 | 8/1974 | Metzler | 24/122.6 |
| 3,899,629 | 8/1975 | Hawkins | 24/131 C |
| 4,015,073 | 3/1977 | Dickerson | 24/131 C |
| 4,066,368 | 1/1978 | Mastalski et al. | |
| 4,360,177 | 11/1982 | Dulhunty | 24/131 C |

Primary Examiner—Victor N. Sakran
Attorney, Agent, or Firm—Schmidt, Johnson, Hovey & Williams

[57] ABSTRACT

A deadending device for guy cables and the like is provided which gives enhanced holding power (typically above the rated strength of the cable) while being relatively inexpensive to produce and easy to field install. The device includes a frustoconical, cable-receiving wedge block, preformed gripping wires for application to the cable and about the block, and a socket for receiving the block and surrounding wire portions. The gripping wires are permanently preformed during manufacturing using a novel method to present, adjacent one end thereof, an arcuate section configured to generally define a portion of an imaginary frustoconical surface complemental with the wedge block periphery. In this manner the wires substantially self-align in an even pattern about the block, and the need for wire-holding flanges or the like on the block or socket is completely eliminated. Preferably, an initially helical, multiple-strand wire subset is bent at two selected locations adjacent one end of the wire to form the arcuate, block-conforming section; this simple operation not only gives the proper wire configuration, but also orients the wires so that, upon application, portions thereof are slightly spaced from the block in such manner that the wires resiliently engage and hold the block in place to facilitate final assembly with the socket.

14 Claims, 18 Drawing Figures

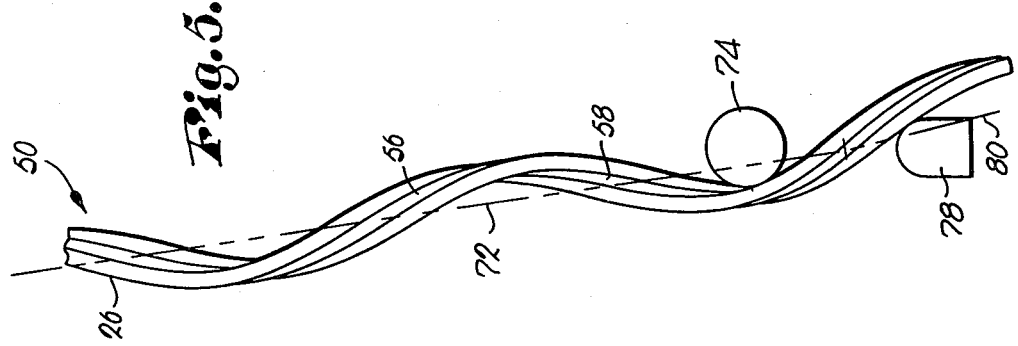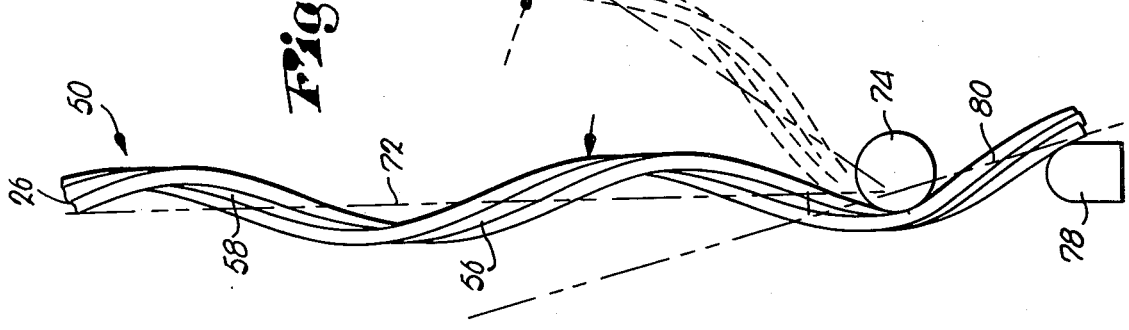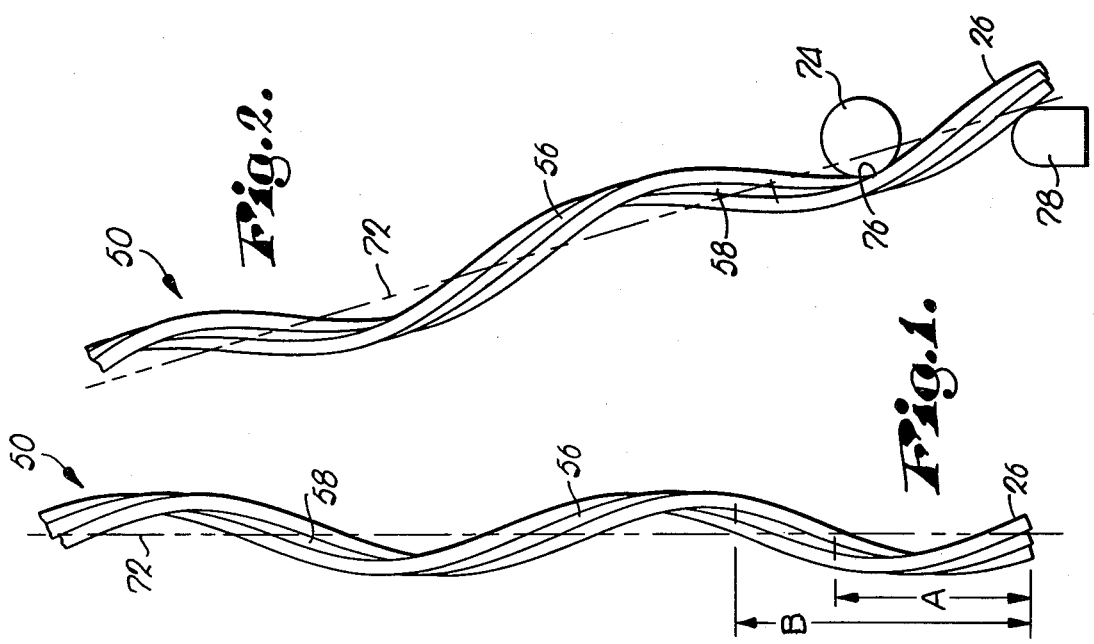

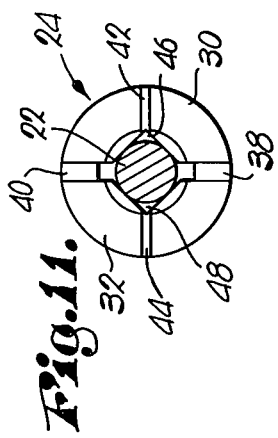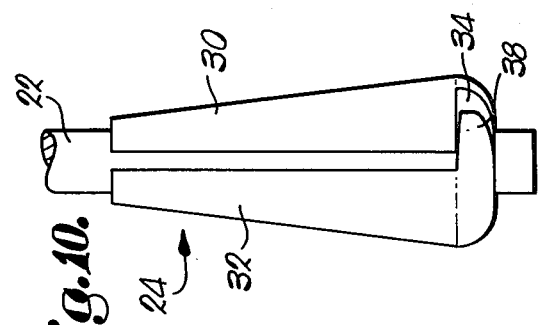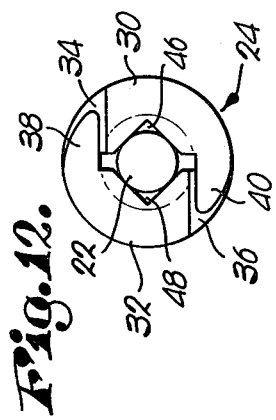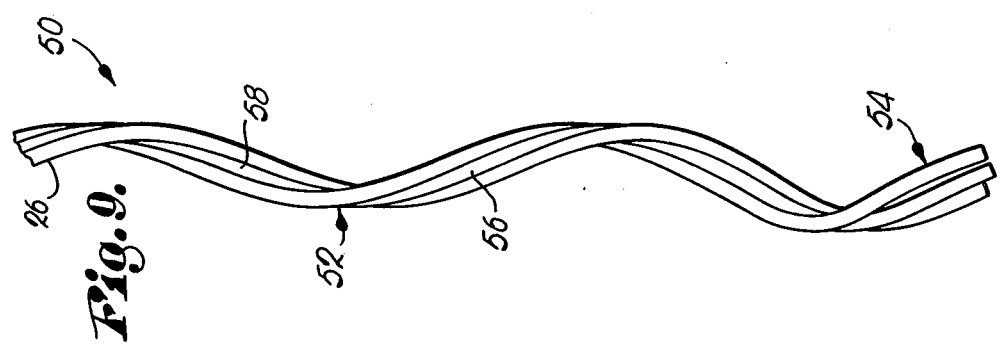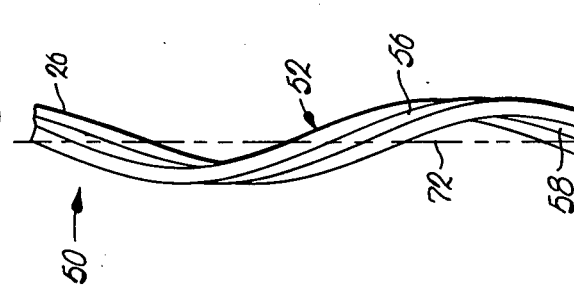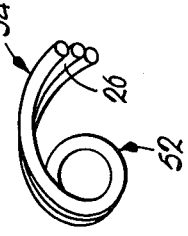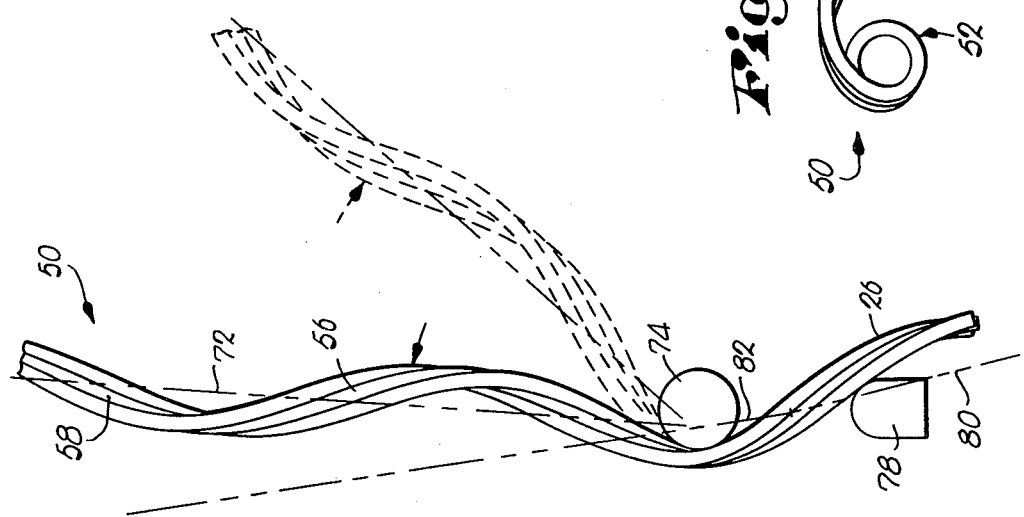

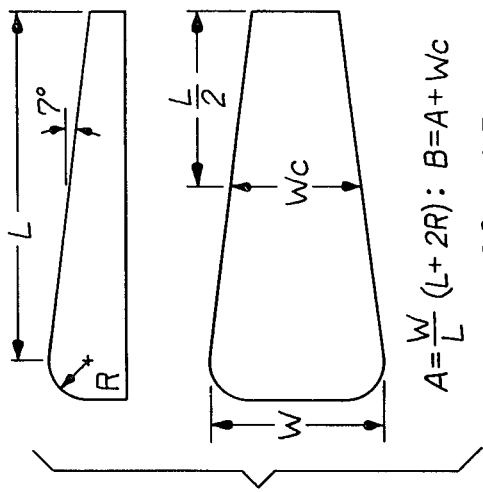
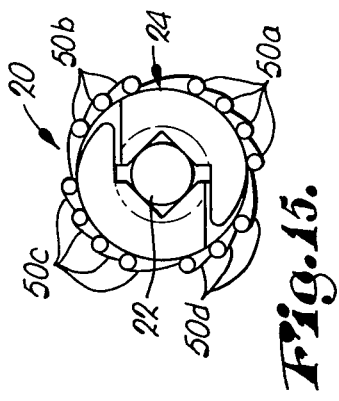
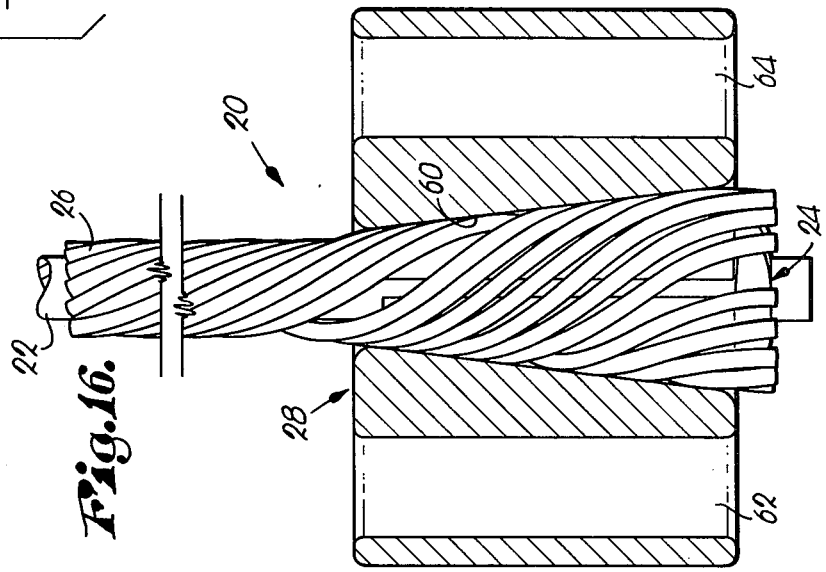
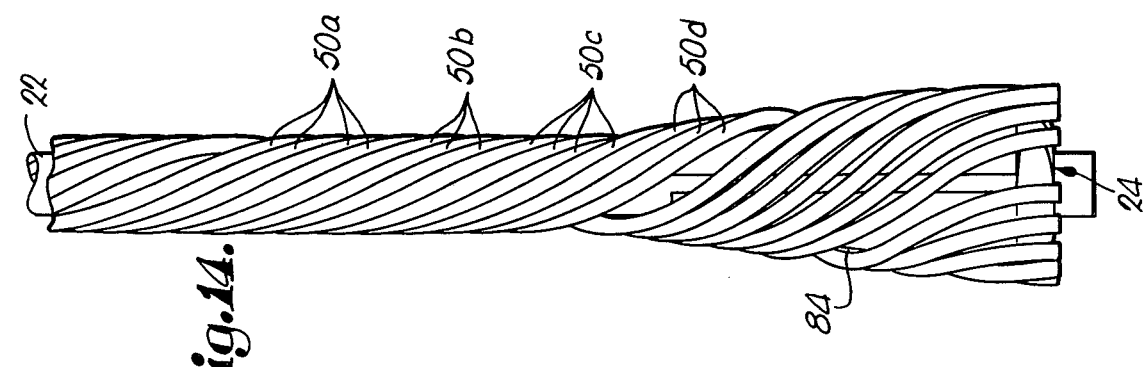
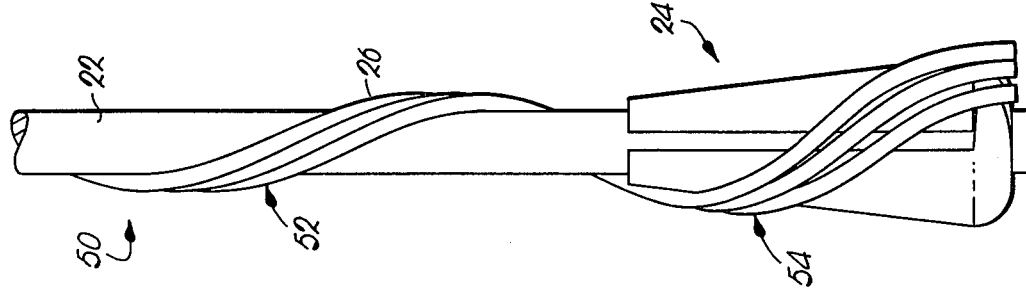

HELICAL WIRE-CONICAL WEDGE GRIPPING DEVICE HAVING CONICALLY FORMED ROD ENDS BETWEEN WEDGE AND COMPLEMENTARY SOCKET THEREFOR

BACKGROUND OF THE INVENTION

1. Field of the Invention

The present invention is broadly concerned with an improved deadending apparatus for use in terminating elongated cables, and includes a cable-receiving wedge block, a plurality of preformed gripping wires which are applied to the cable and about the outer periphery of the wedge block, and a bored socket complemental with the block for receiving the latter and the surrounding wire portions. More particularly, it is concerned with such a deadending device, as well as a method of fabricating the gripping wires forming a part thereof, wherein the gripping wires are permanently preformed beyond the elastic limit thereof prior to disposition about the block in order to present an arcuate, cable-conforming section configured to generally define a portion of an imaginary frustoconical surface generally complemental with the outer surface of the block.

2. Description of the Prior Art

It is a common practice today for electrical utilities to install prefabricated transmission and distribution line towers, as opposed to building such structures on site. Such prefabricated towers are normally transported to the work area and erected using guy cables which are secured to earth anchors buried in the ground adjacent the tower site. As can be appreciated, it is critical that a secure connection be established between the ends of the guy cables and the earth anchors, especially in situations where the tower is subjected to high wind load conditions. Further, many other types of towers and structures require guying for proper support, and here again deadending devices serving to interconnect the guy cables and earth anchoring devices are essential.

Deadending devices have been proposed in the past, but in many cases have proved deficient in one or more respects including cost, ease of installation, or holding capacity. To give but one example, U.S. Pat. No. 3,775,811 to Smrekar, et al. describes a deadend including a frustoconical, cable-receiving block provided with peripheral flange structure adjacent the largest diameter end thereof, helical wires for wrapping about the cable and wedge block and which are designed to be captively retained by the peripheral flange structure of the block, and a socket for receiving the block and wires. A significant problem in connection with units of the type described in U.S. Pat. No. 3,775,811 is the fact that they are relatively difficult to install in the field. That is to say, the installation procedure involves first placing the block on the cable to be deadended, followed by application of the helical wires. While wire application along the length of the cable itself does not present undue difficulty, problems arise when it is attempted to manually deform the wires and captively retain the same in the provided flange structure. Thus, the installer is confronted with the problem of maintaining the block in its proper orientation on the cable while at the same time deforming and securing the metallic gripping wires. This problem is so severe that in many instances installers resort to the expedient of temporarily taping the wedge block to the line prior to application of the gripping wires.

Other deadending and analogous devices are described in U.S. Pat. Nos. 4,066,368, 985,915, 3,561,071, 3,551,959, 3,007,243, 3,551,960, 3,163,706 and 2,341,922.

SUMMARY OF THE INVENTION

Broadly speaking, a deadending device in accordance with the present invention includes an elongated, tapered block configured to engage a cable to be deadended and presenting a generally frustoconical outer surface, an elongated metallic wire element for positioning along the length of the cable and about the block, and socket structure having a tapered bore therein which receives a block and wire portions therearound.

Preferably, the wire element includes an elongated cable-gripping portion having a plurality of preformed, substantially aligned and helical cable-gripping convolutions along the length thereof, along with a block-conforming portion adjacent one end of the cable-gripping portion and configured to be disposed about the frustoconical block. The block-conforming portion is permanently preformed during manufacture thereof beyond the elastic limit of the wire element to present an arcuate section configured to generally define a portion of an imaginary frustoconical surface which is generally complemental with a block outer surface.

In preferred forms, the block is smoothly tapered and free of projections and the like on its periphery. The block also includes a central cable-receiving bore, and while the block could be of integral nature, preferably is in the form of a pair of opposed, mating half sections which cooperatively define therebetween the central cable bore.

Normally a plurality of preformed gripping wires are employed in deadending devices of the invention. Typically, these wires are formed in subsets each comprising three or four individual wire strands. Additionally, a plurality of the multiple-wire subsets are used, so as to give adequate coverage on the cable and frustoconical wedge block.

The present invention also comprehends a novel method for forming a wire element for use in the cable deadending devices hereof. The method involves initial provision of a metallic, preformed wire element presenting a plurality of substantially aligned helical convolutions along the length thereof, an initial, central longitudinal axis, an inner surface proximal to the axis, and an outer surface remote from the axis. Such a preformed wire (or subset) is thereupon permanently bent adjacent one end thereof to form the described block-conforming portion. This involves providing a bending post including a wire element-engaging bending surface, which is typically arcuate in nature. The inner surface of the wire element is next placed against the post bending surface at a selected bending region proximal to one end of the wire. Force is applied to bend the element about the post until the element is permanently deformed beyond the elastic limit of the wire, with the longitudinal axis of the bent portion being oriented at an angle relative to the initial longitudinal axis of the wire, and with the bent end of the element generally defining a portion of an imaginary frustoconical surface.

In particularly preferred forms, the forming method involves a two-step bending operation at spaced locations adjacent one end of the wire. This has been found to give an optimum configuration to the block-conforming portion, while at the same time minimizing manufacturing costs. It has also been surprisingly discovered that the bending method hereof orients the wires such that, upon application to a cable and wedge block, the wires resiliently engage and hold the block in place to facilitate final assembly of the deadending device. In this regard, portions of the wires adjacent the block are slightly spaced from the block surface, and thereby a resilient spring-like holding action is created. Such resiliance also serves, much in the manner of a belleville washer, to hold the socket in place about the wedge block prior to applying final tension to the assembly. Thus, the spring action of the wires permits initial "lock up" of the assembly without the need for hammering the socket for initial seating purposes, such hammering has been known to damage the socket and/or the galvanized coating thereon.

BRIEF DESCRIPTION OF THE DRAWINGS

FIG. 1 is an elevational view of a portion of a gripping wire subset forming a part of the deadending device of the invention;

FIG. 2 is an elevational view depicting the subset of FIG. 1 positioned in a bending jig prior to the first bending step;

FIG. 3 illustrates the final configuration of the subset subsequent to the initial bending operation, with the extent of overbending required to permanently deform the subset being depicted in phantom;

FIG. 4 is an end elevational view of the wire subset after the first bending operation;

FIG. 5 is a view similar to that of FIG. 2, and illustrates the previously bent wire subset positioned in the bending jig apparatus prior to the second bending operation;

FIG. 6 is a view similar to that of FIG. 3, and illustrates a configuration of the subset after the second bending operation, and with the extent of overbend required to permanently deform the subset illustrated in phantom;

FIG. 7 is an end elevational view of the wire subset at the conclusion of the second bending operation;

FIG. 8 is a plan view of a completely formed wire subset;

FIG. 9 is a side elevational view of the formed subset depicted in FIG. 8;

FIG. 10 is a side elevational view of a wedge block assembly in accordance with the invention operatively positioned on a cable to be deadended;

FIG. 11 is an end elevational view of the structure shown in FIG. 10, viewing from the smallest diameter end of the wedge block;

FIG. 12 is an end elevational view of the structure of FIG. 10, viewing from the largest diameter end of the block;

FIG. 13 is an elevational view illustrating the application of one three-strand wire subset over the cable to be deadended and the wedge block;

FIG. 14 is a view similar to that of FIG. 13, but illustrates a total of four wire subsets applied to the cable and wedge block;

FIG. 15 is an end elevational view of the assembly illustrated in FIG. 14, viewing from the largest diameter end of the wedge block and showing the even distribution of the gripping wires about the periphery of the block;

FIG. 16 is a view in partial section which illustrates the assembly of FIG. 14 with a complemental socket receiving the wedge block and adjacent wire portions;

FIG. 17 is a schematic view illustrating certain dimensional relationships of the wedge block as well as emperical equations developed to determine the bend locations for the wire subsets; and FIG. 18 is a schematic elevational view illustrating a prior deadending arrangement as well as certain defining equations pertaining to the block and helical gripping wire.

DESCRIPTION OF THE PREFERRED EMBODIMENT

Turning now to the drawings, and particularly FIGS. 15-16, a deadending device 20 for an elongated cable 22 is illustrated. The device 20 broadly includes an elongated, tapered block 24 for engaging the cable 22, a plurality of preformed gripping wires 26 configured for application along the length of cable 22 and about the outer surface presented by the block 24, and a socket 28 adapted to receive block 24 and the adjacent, surrounding portions of the wires 26.

In more detail, the block 24 is preferably formed of respective, opposed, mating half sections 30, 32. As best seen in FIGS. 10-12, each of the sections 30, 32 includes a recess 34, 36 adjacent the large end thereof, a projecting arm 38, 40 spaced from the corresponding recess 34, 36, and an elongated opening or slit 42, 44 extending from the small end of the corresponding section for a majority of the length of the same. The inner facing surfaces of the sections 30, 32 are relieved as at 46, 48, so that an elongated, central, substantially square in cross-section bore is provided along the length of the block 24 for receipt of the cable 22. As illustrated in FIG. 12, the defining surfaces of the central bore engage the cable 22 for purposes to be made clear.

In the placement of block 24 on line 22, the half sections 30, 32 are placed about cable 22, with the arms 38, 40, being received in the opposed recesses 34, 36 (see FIG. 12). In this condition, the overall block presents a smooth, projection-free, outer frustoconical surface.

The gripping wires 26 are formed of known metallic material, and are advantageously formed into multiple strand subsets 50. Each subset 50 is preformed and includes an elongated, cable-gripping portion 52 and a block-conforming portion 54. As best seen in FIGS. 8, 9 and 13, the cable-gripping portion 52 presents a plurality of preformed, substantially aligned and helical cable-gripping convolutions along the length thereof. These convolutions are preferably of equal pitch length or lead, and moreover are defined by a substantially constant helix angle. However, the convolutions may possibly be variable, e.g., the wires 26 may have equal pitch lengths with varying helix angles along the length of each convolution, or the pitch lengths may be varied. The block-conforming portion 54 is provided adjacent one end of the subset and is configured for disposition about block 24. The block-conforming portion is permanently preformed during manufacture beyond the elastic limit of the wires 26. Thus, prior to the disposition of the portion 54 about block 24, the portion 54 is configured to generally define a portion of an imaginary frustoconical surface which is generally complementary with the outer surface of block 24. As will be readily apparent, each of the wires 26 (and the subsets) presents an outer surface 56 remote from the central longitudinal axis, and an inner surface 58 proximal to this axis. In practice, the inner surface 58 is typically coated with a sharp, hard, friable (aluminum oxide) grit so as to increase the holding power of the subset.

A plurality of subsets 50 are normally used to insure adequate and evenly distributed holding power. As depicted in FIGS. 14 and 16, a total of four subsets 50a, 50b, 50c and 50d are employed, with the subsets 50a and 50c being comprised of four individual wires 26, whereas the subsets 50b and 50d include three wires 26. Of course, the number of subsets employed in a given situation, and the number of wires in each subset, can and does vary.

The socket 28 includes an elongated, tapered bore 60 therethrough which is substantially complemental with the outer surface of block 24. As seen in FIG. 16, a bore 60 receives the block 24 and the block-conforming portions of the wires 26. The outer surfaces 56 of these wires are engaged by the socket structure, and the latter serves to firmly wedge the wires between the socket bore and block 24; in addition, the block 24 is caused to grip the central cable 22, such being permitted by virtue of the two piece construction of the block as well as the slits 42, 44. The socket also includes a pair of spaced mounting bores 62, 64 which are positioned on opposite sides of the central bore 60. The bores 62, 64 permit connection of a bale or other similar structure which can in turn be connected to earth-embedded anchoring means.

As noted above, a prime feature of the present invention resides in the fact that the gripping wires are preformed to present an arcuate section which is substantially complemental with the outer surface of a block 24. In order to appreciate the significance of this constructional feature, attention is directed to FIG. 18 which depicts, in schematic form, a deadending subassembly including a frustoconical wedge block 66 receiving a cable 68, and a helically preformed gripping wire 70 applied to cable 68 and about wedge block 66. In this case, the wire 70 is preformed only to present a series of regular convolutions along the length thereof and does not include a block-conforming portion permanently formed in the wire prior to use thereof in a deadending apparatus. In any event, a study of FIG. 18 will reveal that the equation of wire 70 on cable 68 can be defined as follows:

$$X = a \cos \theta$$
$$Y = a \sin \theta$$
$$Z = K\theta$$

where
 a = radius of cable,
 $\theta$ = angle of rotation,
 K = pitch length constant.

On the other hand, as the helical wire changes from application on cable 68 to application on the conical block 66, the equation of the helix changes to:

$$X = (a + Z \tan \phi) \cos \theta$$

$$Y = (a + Z \tan \phi) \sin \theta$$

where
 $\phi$ = conical wedge taper angle $$Z = K\theta$$

Thus, it will be seen that the helix radius changes from a constant "a" to "a + Z tan $\phi$". Hence, as the helical wire travels onto the wedge it is forced to an ever-increasing diameter. The inside diameter of a helical wire is typically 80% of the outside diameter of the cable. Experience with helically preformed wires indicates that the elastic limit thereof is exceeded when the helix inside diameter is approximately 55% or less of the outside diameter of cable or wedge to which it is being applied.

Using the above equations, it can be shown that with a typical example of a helical wire on a 1" cable and with a wedge having a typical taper angle of 7°, the elastic limit of the helical wire is exceeded after application of only 2" onto the wedge. Since a common wedge length for a cable of this diameter is about 5", the helical wire's elastic limit is exceeded after being applied on only 40% of the wedge length.

U.S. Pat. No. 3,775,811 attempts to overcome the above problem by providing peripheral flange structure on the wedge block which serve to restrain individual wires. A major disadvantage of this approach, however, is that installation in the field is difficult. The individual wires must not only be deformed during application thereof as they proceed up the wedge block, but also the wires must be forced into a flange structure. It is also generally necessary to affix the wedge halves tightly to the cable prior to application of the helical wires, inasmuch as the first wires applied do not wrap around enough of the wedge (180°) to hold the wedge to the cable; thus, the first applied wires tend to force the wedge block off the cable. The present invention overcomes the noted problems by provision of arcuate, preformed, block-conforming portions formed in the wires prior to application thereof. Installation of the deadend in accordance with the invention is greatly facilitated inasmuch as the preformed wires need not be additionally deformed or placed in flange structure during their installation; moreover, the wires actually tend to resiliently hold the block in place which further eases final assembly.

Referring now to FIGS. 1-7, a preferred method for forming a wire subset 50 is illustrated. The first step in the method involves provision of a conventional helically preformed wire subset presenting a plurality of substantially aligned convolutions along the length thereof of substantially equal pitch length and helix angle. In such form, it will be observed that the subset defines an initial, central longitudinal axis 72 which is adjacent the inner surface 58 of the subset. It should also be noted in FIG. 1 that distances "A" and "B" are illustrated and measured from one extreme terminal end of the subset. These distances define the location of the bending regions employed in the preferred method, and are empirically derived in a manner to be made clear.

The next step in the method involves placing the helical wire subset within a bending jig. The jig includes a bending post 74 presenting an arcuate bending surface 76, as well as a stop 78 spaced from post 74. In the method, the wire subset 50 is positioned with the inner surface 58 thereof in engagement with bending post 74 and with the outer surface 56 in engagement with stop 78. It will be observed that the region of contact between inner surface 58 of subset 50 and bending surface 76 is spaced from the end of the subset a distance equal to distance "A".

Referring to FIG. 3, the next step in the method involves applying force to the subset 50 and bending the same about post 74 until the subset is permanently deformed. Such typically involves "overbending" of the wire to a position illustrated in phantom in FIG. 3 (e.g., the overbend may be through an arc of approximately 50°), so that, when the subset "snaps back" it will assume the bent position illustrated in bold lines in FIG. 3. In this orientation, it will be seen that the longitudinal axis 80 of the portion of the subset from the end thereof to the region of the first bend is oriented at an angle (e.g., 14° 14') relative to the initial longitudinal axis 72. Moreover, and referring to FIG. 4, it will be seen that the subset 50, at the bent end thereof, generally defines a portion of an imaginary frustoconical surface. The initial bending action also serves to slightly separate the ends of the individual wires 26.

The subset 50 is next placed within the jig structure with bending surface 76 being located from the end of the subset a distance approximately equal to distance "B". Here again, this orientation involves placing the inner surface 58 of the subset against the bending post, and the outer surface 56 against stop 78.

The final step in the forming method involves bending the subset 50 about the post 74 in a manner essentially identical with that described in connection with the first bending step. That is to say, force is applied to the subset to bend the same around post 74 and permanently deform the subset. This involves an overbending operation, again typically through an arc of about 50°, so that the final orientation of the main body of the subset is as illustrated in FIG. 6. In this orientation, the longitudinal axis 82 of the subset portion extending between the bending regions "A" and "B" lies at an angle relative to the initial longitudinal axis 72 (e.g., 12° 30'). Further, it will be observed that, in this final configuration, the initial longitudinal axis 72 is oriented at an angle relative to first and second terminal stretches of the subset respectively extending between the bending regions "A" and "B", and region "A" and the extreme end of the subset. Finally, the longitudinal axes of the mentioned terminal stretches are also at an angle relative to one another.

While in the embodiment illustrated, both bending regions are located within the first convolution of the wire subset 50 commencing at the extreme end thereof, the invention is not so limited. Thus, in other cases the bend regions may be located at different positions and/or within different convolutions.

FIGS. 7–9 illustrate the configuration of the final subset. It will be seen that the simple, two-step bending operation provides a properly formed arcuate block-conforming end portion with the ends of the subset wires being separated. It is significant that, at first blush, it would be assumed that in order to properly form the subset 50 to give block-conforming end 54, the subset end must be in effect "uncoiled" or bent away from the axis 72. Contrary to this expectation however, simple bending of the subset in the manner described gives the desired results.

Attention is next directed to FIG. 17 which illustrates, in schematic form, one of the block sections 32 or 34. Also forming a part of this Figure are certain dimensional relationships of the block which are important for a determination of the proper distances "A" and "B". Specifically, it will be seen that the block includes a smaller diameter end and a larger diameter end, the latter having a terminal radius R. The block further has a length L extending from the smaller diameter end thereof to the beginning of the larger diameter end radius, a largest diameter W, and a central diameter $W_c$ taken at a distance L/2 from the smaller diameter end. It has been found that the first bending region should be spaced from the extreme end of the subset a distance approximately equal to "A" where "A" is determined by the equation $$A = (W/L)(L+2R)$$

On the other hand, the second bending region should be spaced from the extreme end of the subset a distance approximately equal to "B" where "B" is determined by the equation $$B = A + W_c$$

As noted, the foregoing equations are empirically derived, but have been found to be particularly useful in situations where, as is preferred, a taper angle of the block 24 ranges from about 5° to 9°, the ratio of the inner diameter of the convolutions of the cable-gripping portion 52 to the outer diameter of the cable 22 is from about 0.7 to 0.9, and the helix angle of the convolutions forming the cable-gripping portion 52 range from about 22° to 26°.

In use, the socket 28 is first threaded onto cable 22 and slid up the same to a remote location. The mating sections 30, 32 of the block 24 are next placed on line 22 at a preselected point permitting proper tensioning and take-up of the cable when it is secured to the earth-embedded anchor. One of the subsets 50 is next applied to the block and cable, commencing at the block using the block-conforming portion and proceeding about 240° of the block surface, whereupon the convolutions of portion 52 are applied to the cable; this first subset serves to hold the block parts to the central cable without the need for taping or other conventional expedients. The subsequent wire subsets are then applied in the same manner, until the subassembly assumes the configuration illustrated in FIG. 14. In this orientation, it will be seen that the subsets cover a substantial portion of the cable-block envelope. Further, parts of the wires making up block-conforming portion 54 are slightly spaced from the outer surface of the block as at 84. Such parts generally conform to the region along the block-conforming portion about and between the bending regions "A" and "B". This construction also gives a resilient holding action on the block sections by the wire subsets. Finally, the two-step bending operation tends to "fan out" the wires making up the respective subsets, which gives an even load distribution around the wedge block and socket. Thus, there is no need for spaced notches or the like to hold and distribute the wires evenly about the block.

The final installation step involves sliding the socket 28 back down the cable and firmly seating the socket on the block and wires. As noted above, such seating can be accomplished without the need for hammering the socket, and moreover the resilience of the wire portions between the block and socket serves to initially maintain the overall assembly in its operative position on the cable. Final tensioning of the assembly through use of a bale or the like (not shown) pulls the socket into tight wedging engagement with the wires and causes the block to compress against cable 22.

Actual testing with deadending devices in accordance with the invention has demonstrated that the devices exhibit extremely high holding capabilities. In one such test, an 18' length of metallic cable was fitted, on each end thereof, with a deadending device in accordance with the invention. The test apparatus was then placed under tension and was loaded to destruction. The cable failed at 71,000 pounds tension, which is 115.1% of the rated strength of the cable. The strand failed at mid-span, and no significant slippage of the deadends relative to the cable was observed. This test also demonstrated that the deadending devices of the invention do not allow the outer strands of the cable to shift relative to the inner strands. Such relative shifting of the cable strands can lead to premature failure.

We claim:

1. A deadending device for an elongated cable or the like, comprising:

an elongated, tapered block configured to engage said cable and presenting a generally frustoconical surface, said block including a plurality of separate block sections cooperatively presenting said outer surface;

an elongated metallic wire element for positioning along the length of said cable and about said block, including:

an elongated cable-gripping portion having a plurality of preformed, substantially aligned and helical cable-gripping convolutions along the length thereof and configured for application to said cable, said cable-gripping convolutions presenting a first longitudinal axis;

a block-conforming portion adjacent one end of said cable-gripping portion and configured to be disposed about said block, said block-conforming portion having been permanently preformed beyond the elastic limit of said wire element prior to disposition thereof about said block to present an arcuate section configured to generally define a portion of an imaginary frustoconical surface generally complementary with said block outer surface, said arcuate section presenting a second longitudinal axis substantially aligned with said first longitudinal axis, said arcuate section further being configured to resiliently engage and hold said block sections in engagement with said cable without the need for taping or the like of the block sections to the cable; and socket structure having a tapered bore therein receiving said block and block-conforming portion.

2. The device as set forth in claim 1, said block and socket structure being free of structure for captively retaining the end of said wire element.

3. The device as set forth in claim 1, said block including structure defining a central, axially extending, cable-receiving bore therethrough.

4. The device as set forth in claim 3, said block comprising a pair of opposed, complementary sections cooperatively defining said outer surface and central bore.

5. The device as set forth in claim 1, said wire element comprising a plurality of elongated, juxtaposed strands forming a wire element subset.

6. The device as set forth in claim 5, there being a plurality of said subsets.

7. The device as set forth in claim 1, said arcuate section being configured such that a portion thereof is slightly spaced from said block outer surface, prior to application of said socket structure thereover.

8. The device as set forth in claim 7, said arcuate section being configured for providing resilient spring action to hold said socket structure firmly on the block prior to application of a tension load to said cable.

9. The device as set forth in claim 1, said socket structure including means for connection thereof to earth-embedded anchoring means.

10. The device as set forth in claim 1, said block having an angle of taper within the range of from about 5° to 9°.

11. The device as set forth in claim 1, the ratio of the inner diameter defined by said cable-gripping portion and the outer diameter of said cable being within the range of from about 0.7 to 0.9.

12. The device as set forth in claim 1, the helix angle of the convolutions within said cable-gripping portion being from about 22° to 26°.

13. The device as set forth in claim 1, said cable-gripping portion being bent at two spaced bending regions proximal said one end.

14. The device as set forth in claim 13, said block including a smaller diameter end, a longer diameter having a terminal radius R, a length L extending from said smaller diameter end to the beginning of said radius R, a largest diameter W, and a central diameter $W_c$ taken at a distance L/2 from said smaller diameter end, one of said bending regions being spaced from the extreme one end of said element a distance approximately equal to A, where A is determined by the equation $$A = (W/L)(L+2R),$$

and the other of said bending regions is spaced from said extreme one end a distance approximately equal to B, where B is determined by the equation $$B = A + W_c.$$

* * * * *